United States Patent Office 3,218,103
Patented Nov. 16, 1965

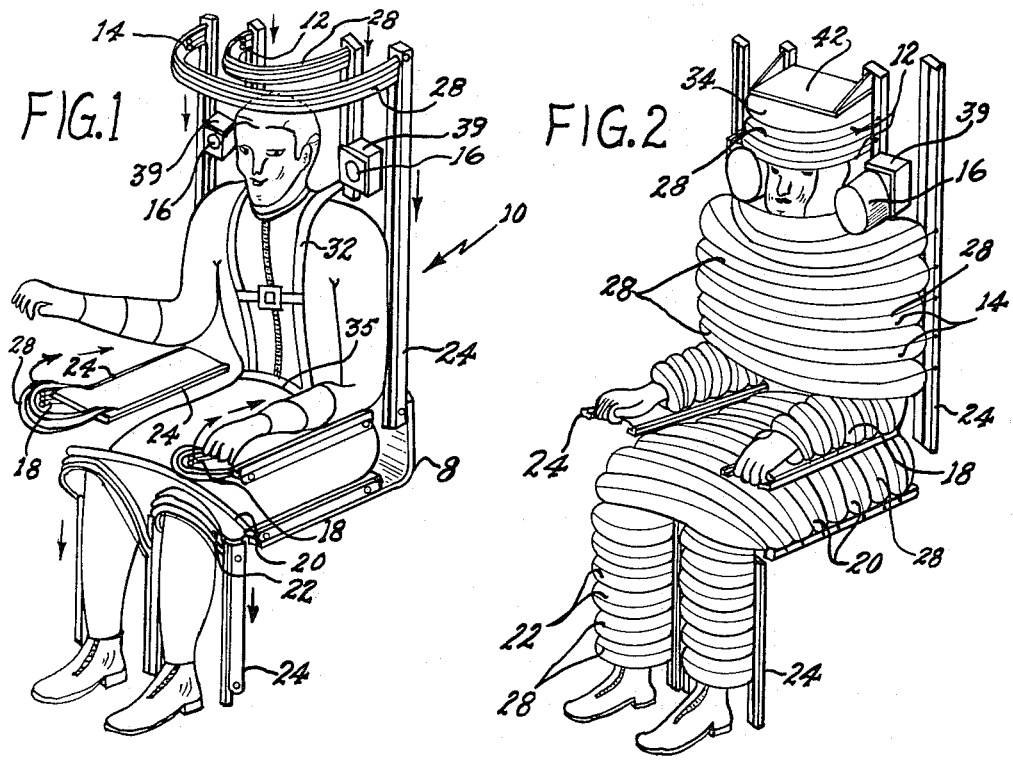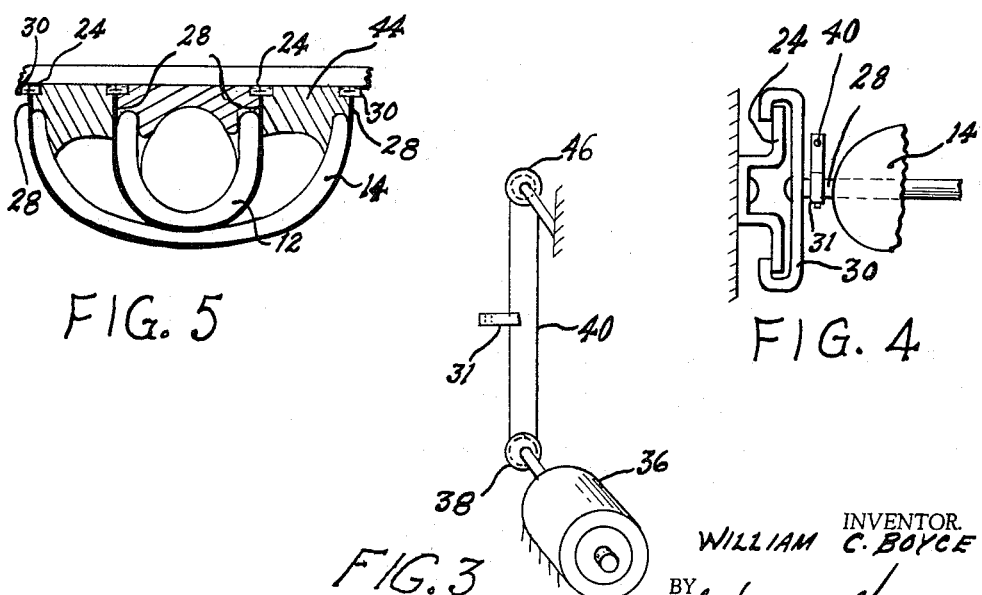

3,218,103
PNEUMATIC RESTRAINT SYSTEM
William C. Boyce, Dallas, Tex., assignor, by mesne assignments, to the United States of America as represented by the Secretary of the Air Force
Filed Feb. 27, 1964, Ser. No. 347,979
7 Claims. (Cl. 297—384)

This invention relates generally to restraint systems for occupants of space vehicles or high performance aircraft and, more particularly, to a system which enables either total or partial restraint without interfering with normal movement when the system is not utilized. Restraint systems are required in order to protect an occupant of one of the aforementioned vehicles from the effects of acceleration, deceleration and vibration. The device has particular utility for the protection of astronauts on reentry and deceleration for an earth or water landing.

The system of this invention employs groups or curtains of inflatable fabric bags or bladders which are supported by appropriately curved metal frames. The latter are attached at their ends to slides operating on tracks similar to the arrangement for the sliding of a sail on the mast of a sailboat. When the system is not in use, a stowed position is provided whereby the bags are collapsed to a position out of the way of the astronaut. The lower leg restraint bladders and those for the lap are stowed above and forward of the knees while the forearm restraint components are stowed forward of the hands and could, if required, be made to surround any hand control device. The remaining restraint systems are stowed above the head and shoulders. The simplicity of the aforementioned system allows for any conventional closed cable system and inflation system.

Comfort is a very important requirement for restraint systems since astronauts are required to be within the space vehicle for protracted periods. Accordingly, ease of ingress and egress are important considerations for the design of a restraint system.

Accordingly, it is an object of this invention to provide a protective restraint system for astronauts which is comfortable when the astronaut is being restrained and which does not cause interferences with normal movement of the astronaut when the system is in its stowed position.

It is another object of this invention to provide a protective system for the restraint of astronauts which allows for easy ingress and egress.

It is a still further object of this invention to provide a restraint system for astronauts which may be made of inexpensive, readily obtainable materials that lend themselves to standard mass production manufacturing techniques.

These and other advantages, features and objects of the invention will become more apparent from the following description taken in connection with the illustrative embodiments in the accompanying drawings, wherein:

FIGURE 1 is a schematic representation of the restraint system in its stowed position, the head support and bladder having been removed;

FIGURE 2 is a schematic representation of the system in its restraint position;

FIGURE 3 is a schematic representation of a cable system for positioning the restraint systems;

FIGURE 4 is a detailed view of the track and slide arrangement for positioning the system; and FIGURE 5 is a top view, partly in section, illustrating the relative position of only the head and torso curtains.

Referring to the figures, there is shown an astronaut in a seated position with a restraint system 10 provided for mounting on a seat which is attached to a space capsule or other vehicle. In the interest of clarity only a small portion of the seat 8 is shown. Basically, the system comprises a curtain of bladders 12 for head restraint, an upper body curtain of bladders 14, a pair of shoulder bladders 16, forearm bladders 18, lower lap curtains 20, lower leg curtains 22 and a bladder 34 for the top of the head. Each of the curtains is formed of a series of bladders in the general form of a semicircle wherein each bladder is interconnected with the adjacent bladders in the same curtain thereby allowing for simultaneous inflation of all of the bladders in a curtain. The interconnection of the separate bladders would be in a manner similar to that achieved with conventional air mattress systems. Each bladder is formed of a tube of fabric and receives its support by being secured to a metal frame 28 adhesively or by strapping.

Each of the frames 28 for the system has a channeled slide 30 (see FIGURE 4) at each end for engagement with a pair of tracks 24 which are secured to either the seat 8 or the vehicle framework. Metal frames 28 may be provided for each bladder forming the curtain or, alternatively, may be supplied only for the top and bottom bladders of each curtain.

Any cable system of the endless type with at least one frame of a curtain attached to the cabling may be utilized for positioning the frames and bladders forming the separate restraint curtain units. As shown schematically in FIGURE 4, a clamp means at 31 may be provided on a frame 28. As seen in FIGURE 3, a motor 36 or other source of supply of power is arranged by means of a pulley 38 to cause movement of the cable 40 which is secured to the clamp 31, which is attached to a curtain frame 28. An idler pulley 46 may be provided adjacent one end of a track 24. Separate motors may be utilized for each restraint system, or alternatively, a fewer number may be utilized where the proper choice of pulleys is made to allow for the different lengths of travel for the individual restraint sections from stowed to restraint position.

The attachment of the cable 40 to the metal frames 28 is located at a position dependent upon the direction of travel of the metal frame to extend the curtain forming a restraint system for a particular portion of the body of the astronaut. The head curtain 12 would, therefore, have the bottom-most frame 28 secured to the cable 40 as would the upper body curtain of bladders 14 and leg curtains 22. The forearm bladders 18 would have the topmost frame 28 secured to the cable 40 in order to provide for positioning of forearm restraint. When the unit is inflated with only one frame secured in position, the remaining frames with their associated bladders take up their proper position upon inflation of the curtains. Thus, an endless cable system is provided for extending and positioning the bladders in the arrangement to form a curtain at desired positions for protection of specific portions of the anatomy of a vehicle occupant.

As can be seen in the figures, the lower leg curtain of bladders is stowed slightly forward and above the knees and would be positioned to provide restraint as shown in FIGURE 2 by movement of the bottom-most metal frame 28 of each curtain unit in the direction of the arrows (FIGURE 1) along the vertical tracks 24. The lap curtain is also stowed above and forward of the knees, however, its movement along horizontal tracks 24 would allow it to extend to provide restraint as illustrated in FIGURE 2. The forearm bladders would have their slides located on the arm rest of the seat 8 and would operate in the manner similar to that described relative to the lap and lower leg curtains except that the entire arrangement would be rotated such that it would encircle the wrist of the occupant prior to the extension of the system in the direction of the arrows. Both the head curtain and upper body curtain of bladders are moved downwardly along their slides from the position shown in FIGURE 1 to that shown in FIGURE 2. Bladders 16 for the shoulder are shown inflated in FIGURE 2 and merely extend from supports 39 in order to abut the astronaut's shoulder. It should be noted that an opening is provided adjacent bladders 16 and curtains 12 and 14 to allow for normal breathing and vision. In FIGURE 2, there is shown a separate head bladder 34 attached to a support 42 which is attached either to the seat 8 or the vehicle, and the bladder is arranged to extend from below the support to abut the top of the occupant's head, when the bladder is inflated.

When the occupant of a space vehicle is properly seated and restraint is required, the metal frames 28 will be moved into position by the cable system and conventional pneumatic inflation means (not shown) will produce the result illustrated in FIGURE 2 whereby the occupant will be pressed firmly against pads 44 (FIGURE 5) and seat cushions of the seat 8. The amount of restraint may be controlled by the pressure within the bladders which in turn could be controlled by any conventional, adjustable pneumatic valve system. It is anticipated that partial restraint might be required, therefore, any combination of the curtains or separate bladders might be energized to provide restraint of only those portions of the anatomy which are activated. It is also contemplated that the system might be either manual or automatic.

The system thus far described may be utilized with other type harnesses such as the chest strap 32 and lap belt 35 which would be utilized to properly position the astronaut for initiation of the restraint system and/or the prevention of submarining of the astronaut.

Thus, there has been described a novel restraint system for the protection of occupants of space vehicles or high performance aircraft which provides comfort in the restrained and unrestrained positions and which is capable of either partial or total restraint without seriously interferring with ingress or egress or normal movement required by an astronaut in his piloting of his vehicle.

Although the invention has been described with reference to a particular embodiment, it will be understood to those skilled in the art that the invention is capable of a variety of alternative embodiments within the spirit and scope of the appended claims.

I claim:

1. A restraint system comprising a pair of tracks, a generally semicircular frame, means at each end of said frame in sliding engagement with a track of said pair of tracks, an inflatable curtain secured to said frame, and means for moving said curtain and frame along said track.

2. A system as defined in claim 1 including additional semi-circular frames having means at each end thereof for sliding engagement with a track of said pair of tracks, said additional semi-circular frames being secured to said inflatable curtain.

3. A system as defined in claim 1 wherein said inflatable curtain comprises a series of inflatable, interconnected bladders.

4. A restraint system for a seated astronaut comprising a pair of vertically oriented tracks extending from above and straddling the head area to a horizontal plane at the forehead area of said astronaut, a second pair of vertically oriented tracks straddling the astronaut's trunk area and extending from above the head area to the hip area, a third and fourth pair of vertically oriented tracks, each straddling the leg area and extending from the knees to the ankles, a first pair of horizontal tracks straddling the thigh area from the knees to the hips, a second and third pair of horizontally oriented tracks straddling the forearm area and extending from the hands to the elbows, a series of generally semicircular frames associated with each pair of tracks, means at each end of each frame for sliding engagement with a track of its associated pair of tracks, an inflatable curtain secured to the frames of each series of frames, and means for moving each curtain by means of a frame attached thereto along its associated pair of tracks.

5. A restraint system as defined in claim 4 wherein each of said curtains comprises a series of inflatable, interconnected bladders, each bladder being secured to a single frame.

6. A restraint system as defined in claim 4 including a support above the head area of a seated astronaut, and inflatable means secured to said support for abutting the head of an astronaut when said inflatable means is in its inflated condition.

7. A restraint system as defined in claim 4 including a support above each shoulder area of a seated astronaut, and inflatatable means secured to each support for extension thereof over the shoulders of an astronaut when said inflated means are in their inflated condition.

References Cited by the Examiner
UNITED STATES PATENTS

| | | | |
|---|---|---|---|
| 2,806,737 | 9/1957 | Maxwell | 280—150 |
| 2,834,606 | 5/1958 | Bertrand | 280—150 |
| 2,854,281 | 9/1958 | Cassin | 280—150 |
| 2,933,343 | 4/1960 | Potts | 280—150 |
| 2,942,913 | 6/1960 | Felts | 280—150 |

FRANK B. SHERRY, *Primary Examiner.*